DE LASKI T. CLEMONS.
ABRADING OR POLISHING MACHINE.
APPLICATION FILED JAN. 26, 1911.

1,145,184.

Patented July 6, 1915.
8 SHEETS—SHEET 1.

Witnesses:

Inventor:
DeLaski T. Clemons,
By Luther L. Miller
Atty.

DE LASKI T. CLEMONS.
ABRADING OR POLISHING MACHINE.
APPLICATION FILED JAN. 26, 1911.

1,145,184.

Patented July 6, 1915.
8 SHEETS—SHEET 4.

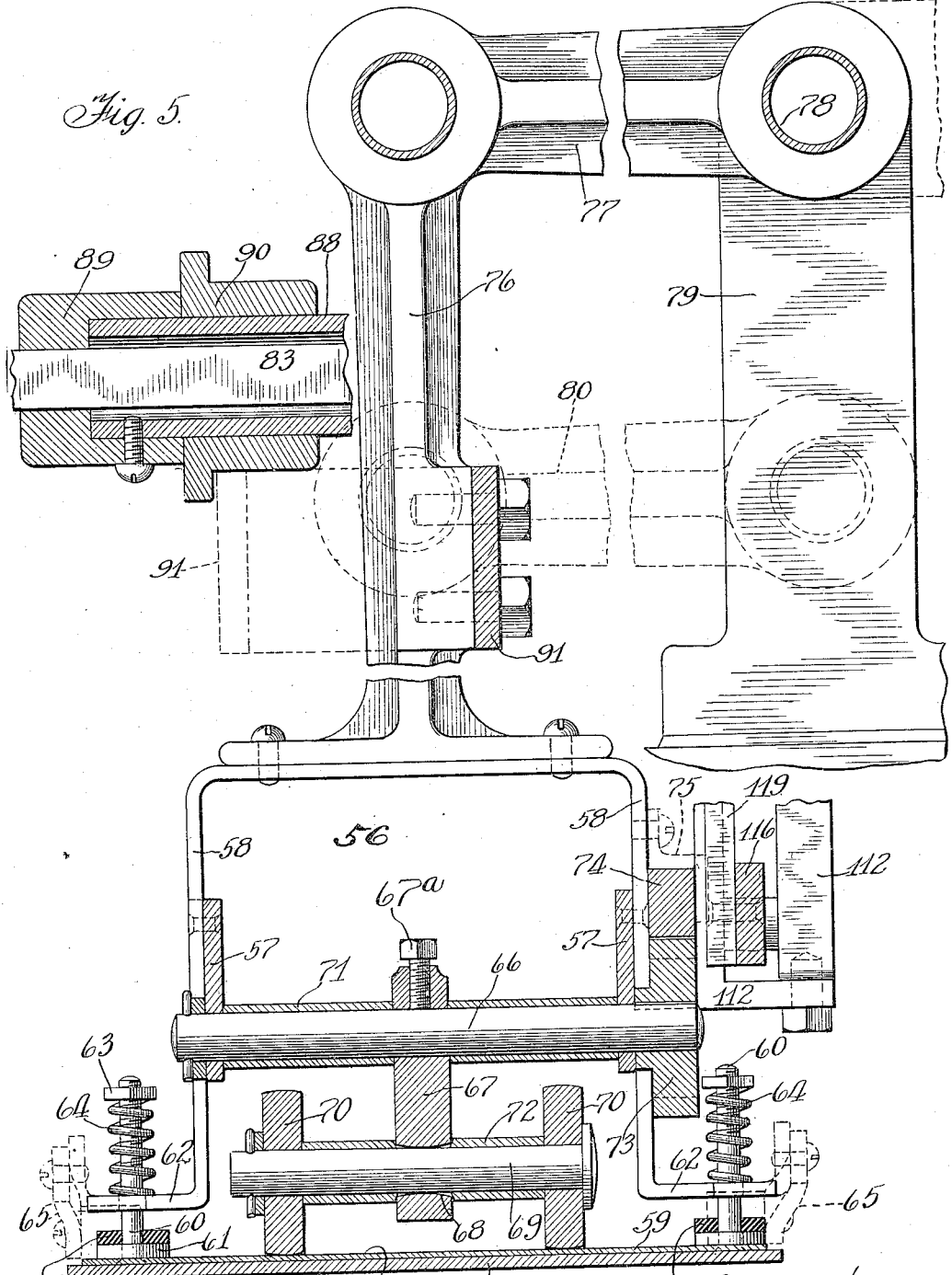

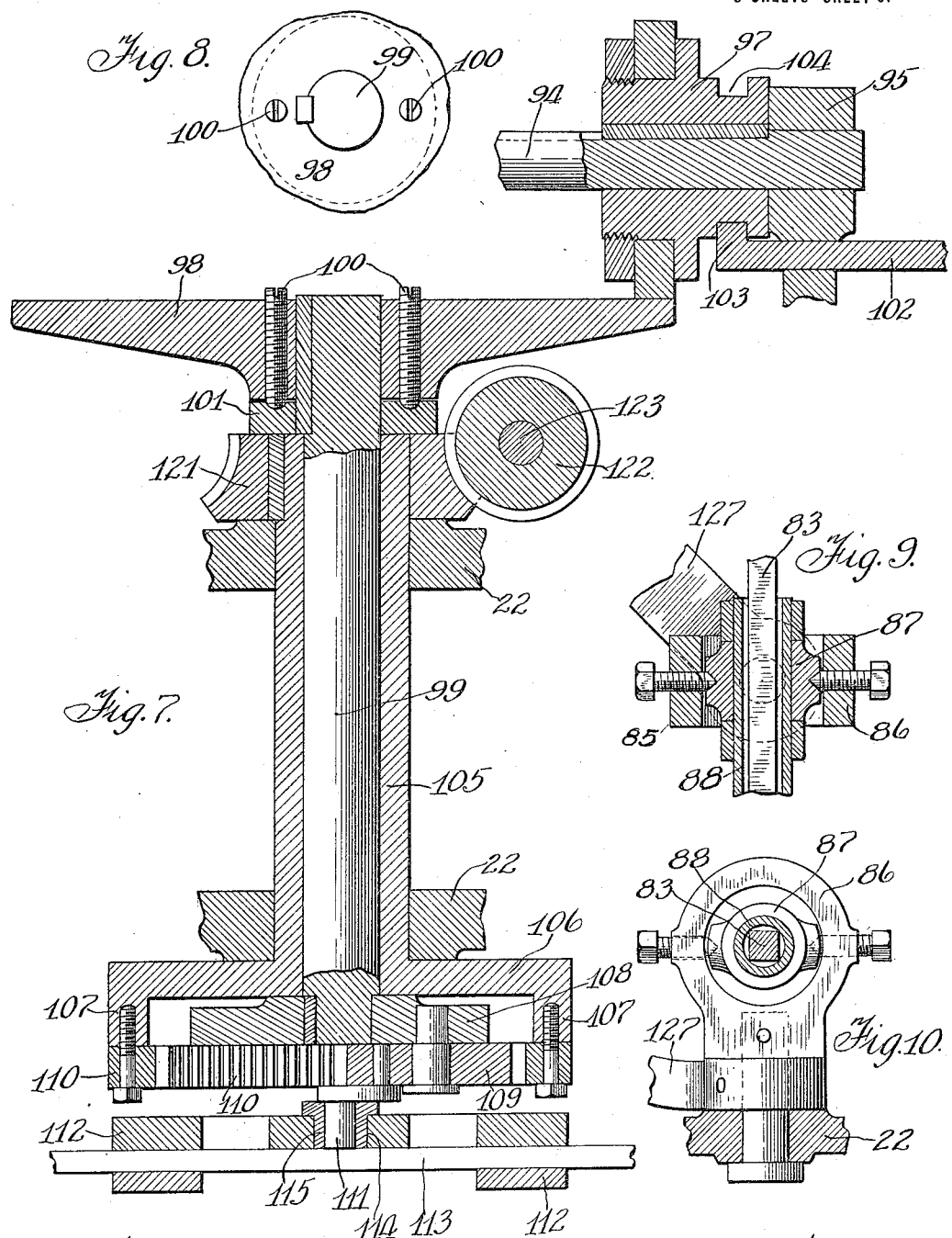

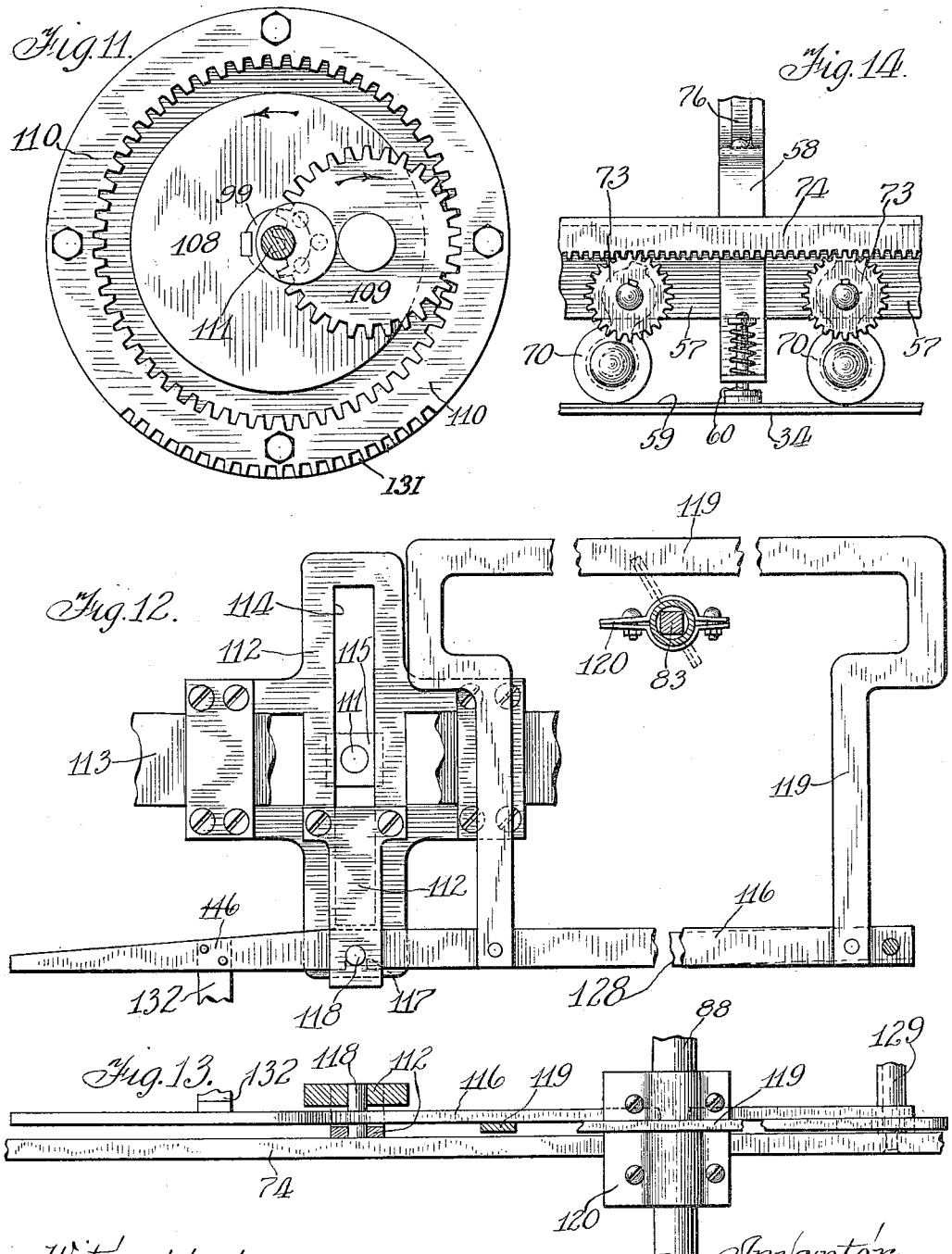

DE LASKI T. CLEMONS.
ABRADING OR POLISHING MACHINE.
APPLICATION FILED JAN. 26, 1911.
1,145,184.
Patented July 6, 1915.
8 SHEETS—SHEET 8.
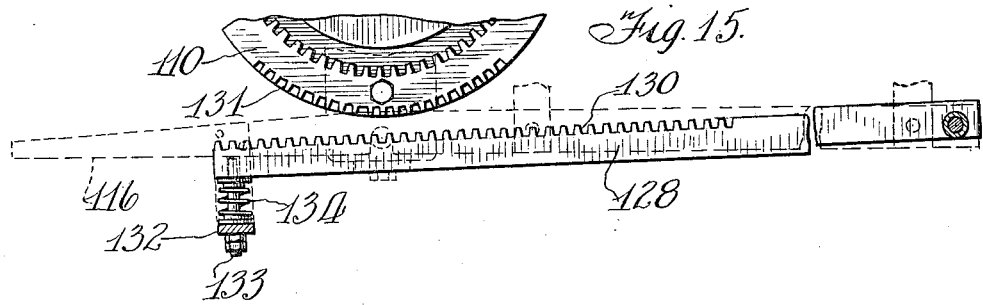
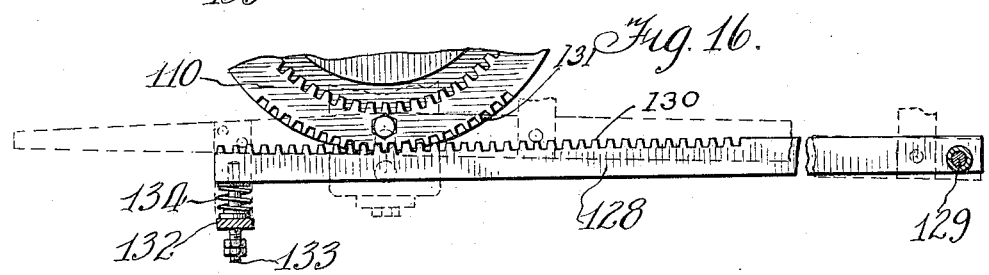
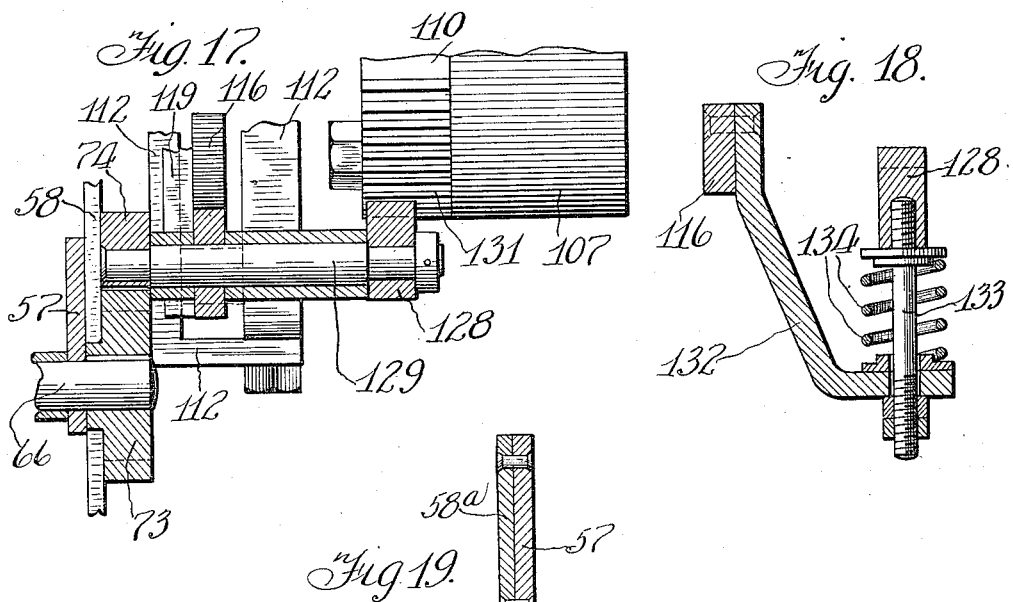
Witnesses:
J. C. Devick.
C. Paul Parker.
Inventor:
DeLaski T. Clemons,
By Luther L. Miller
Atty.
COLUMBIA PLANOGRAPH CO., WASHINGTON, D. C.

UNITED STATES PATENT OFFICE.

DE LASKI T. CLEMONS, OF HORNELL, NEW YORK, ASSIGNOR TO C. MATTISON MACHINE WORKS, OF BELOIT, WISCONSIN, A CORPORATION OF WISCONSIN.

ABRADING OR POLISHING MACHINE.

1,145,184. Specification of Letters Patent. Patented July 6, 1915.

Application filed January 26, 1911. Serial No. 604,808.

*To all whom it may concern:*

Be it known that I, DE LASKI T. CLEMONS, a citizen of the United States, residing at Hornell, in the county of Steuben and State of New York, have invented certain new and useful Improvements in Abrading or Polishing Machines, of which the following is a specification.

This invention relates to an abrading or polishing machine of the type comprising an endless abrading or polishing belt and means for pressing a portion of the belt against the work to be operated on. Certain features of the invention, however, are applicable to machines of other types than that herein described.

The aim of the invention, generally stated, is to produce a machine which is arranged for automatic action under manual control, and is also adapted to be manually operated, as desired.

One of the objects of the invention is to provide an improved means for pressing the belt to its work.

Another object is to provide an improved means for shifting the point of contact of the belt along the work.

Another object is to provide improved means for actuating the reciprocatory member of the shifting means, and for changing the length of stroke of said member.

A further object is to provide means for controlling the connection between said actuating means and said shifting means.

A further object is the provision of manually operable means for shifting the contact point of the belt when the automatic shifting means is disengaged.

Another object is the production of a machine of this class in which said pressing means, connection-controlling means and stroke-changing means are all operable by a single hand lever extending into convenient reach of the operator.

Further objects are to improve certain features of construction, as will be more fully pointed out in the detailed description.

Figure 1:
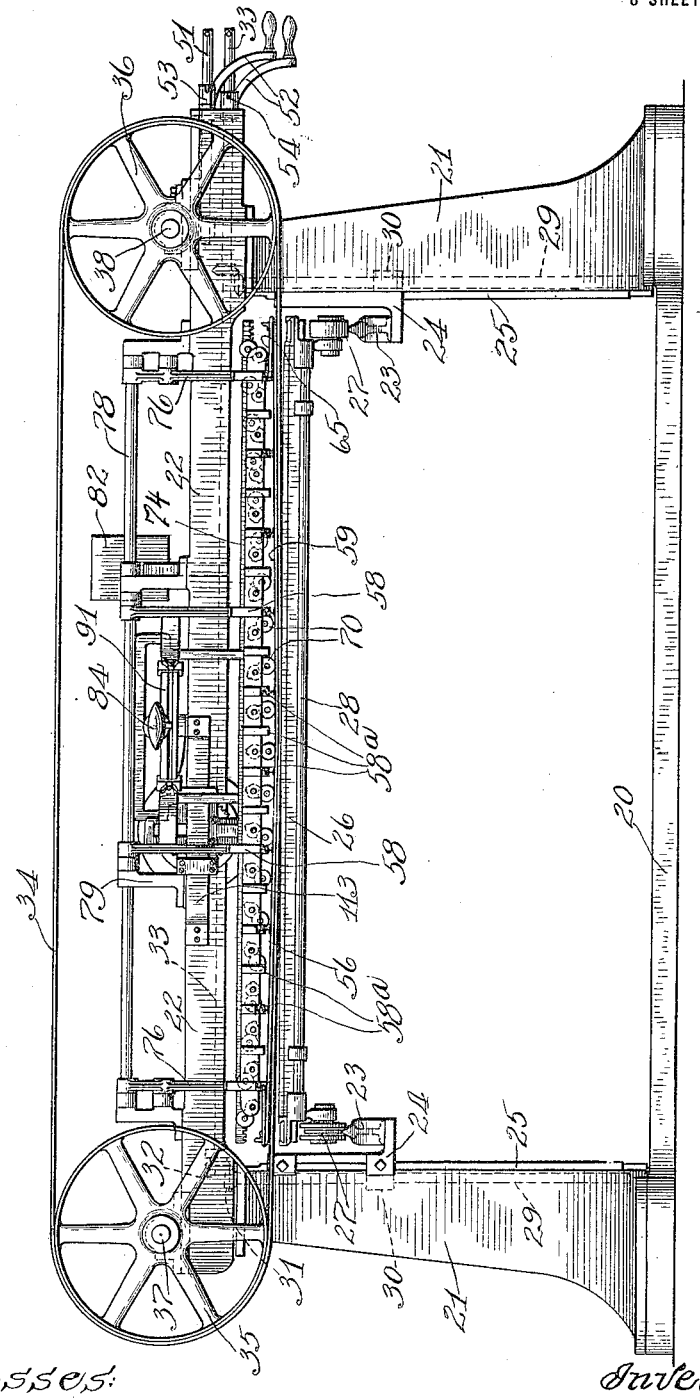
Figure 2:
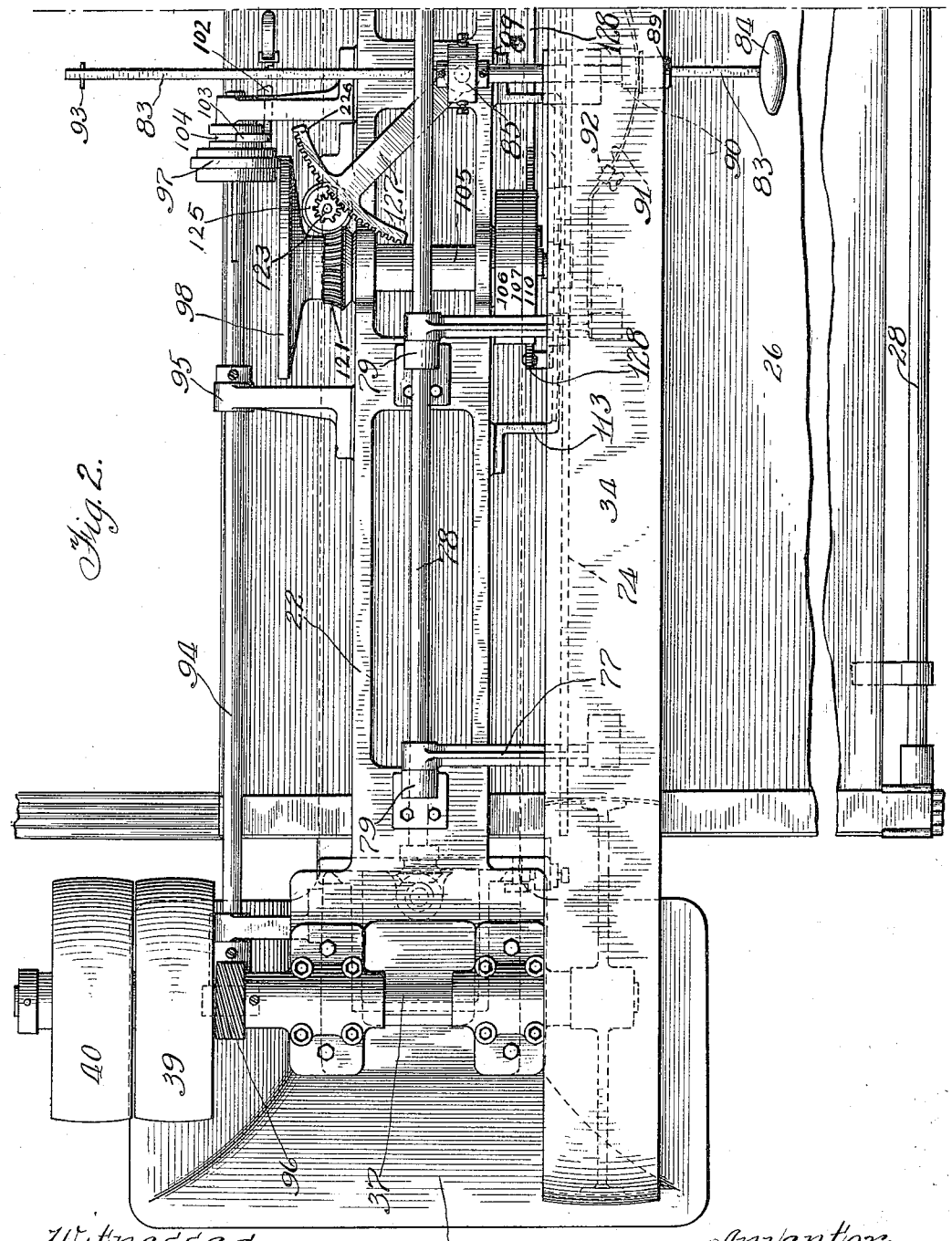
Figure 3:
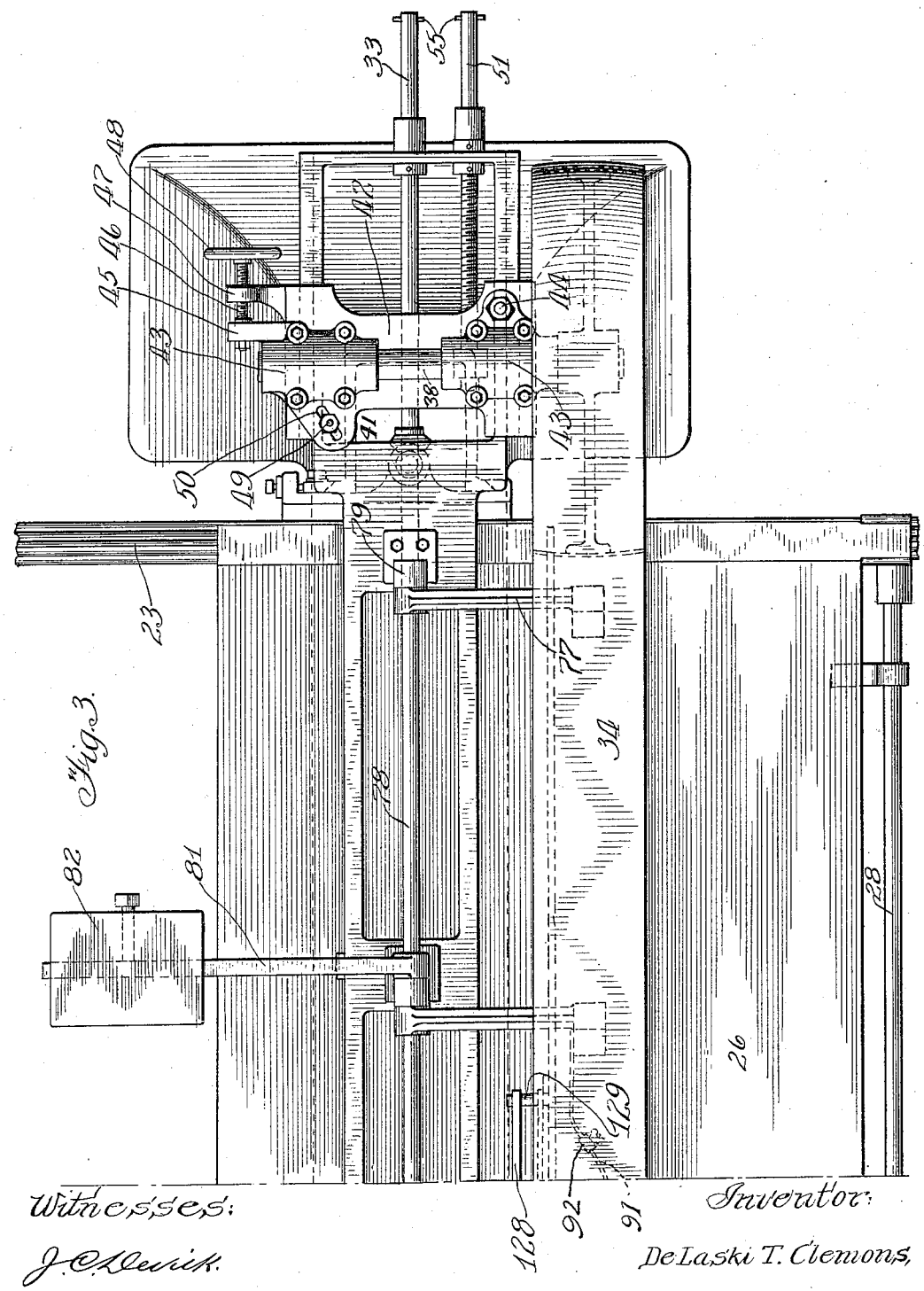
Figure 4:
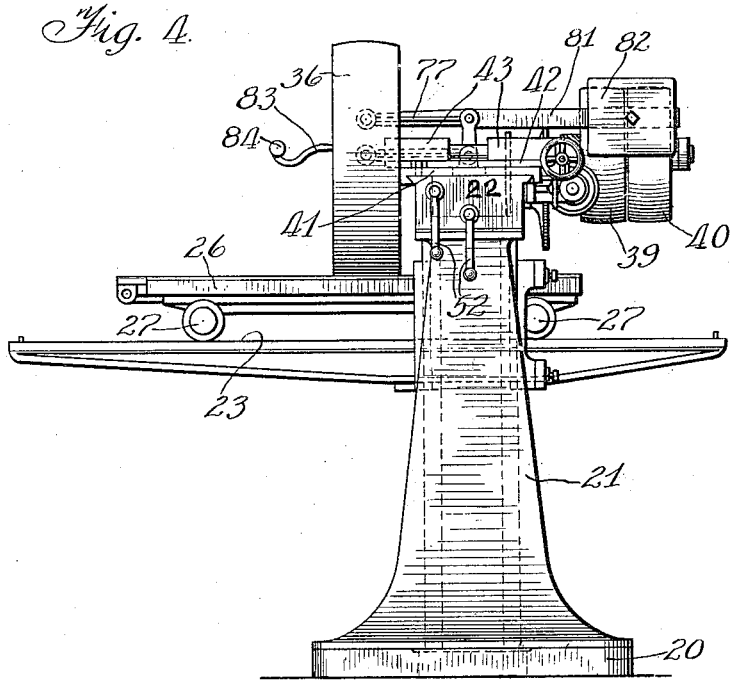
Figure 6:
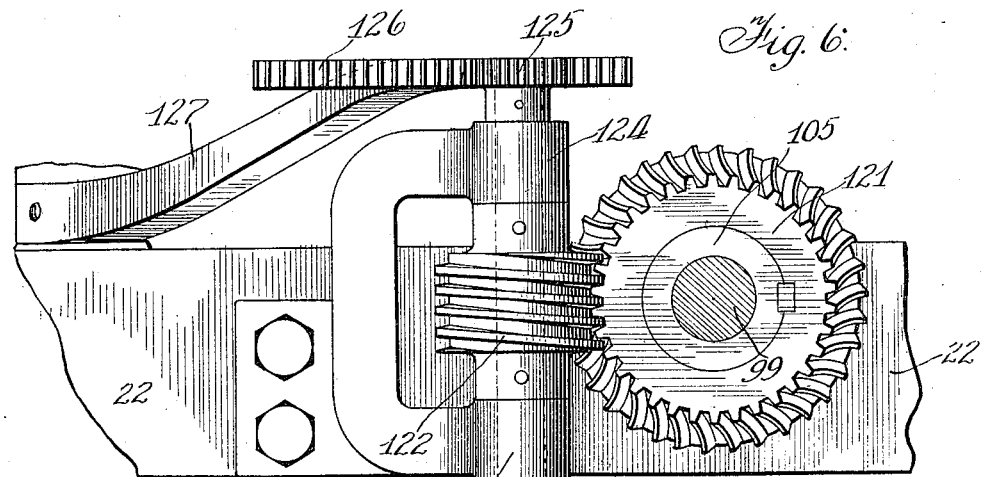

In the accompanying drawings Figure 1 is a side elevation of an abrading or polishing machine embodying the features of my invention. Figs. 2 and 3 together constitute a top plan view of the machine. Fig. 4 is an end elevation. Fig. 5 is a fragmental vertical sectional view through the central portion of the machine. Fig. 6 is a view of a portion of the means for changing the stroke of the shiftable belt-pressing means. Fig. 7 is a sectional view showing the means for driving the shifting means and the means for changing the stroke of said shifting means. Fig. 8 is a fragmentary elevation of the friction driving disk comprised in said driving means. Fig. 9 is a view in horizontal section of the means for supporting the operating handle. Fig. 10 is a vertical section showing said means. Fig. 11 is a detail view of certain gearing comprised in the means for adjusting the stroke of the belt-shifting means. Fig. 12 is a fragmentary elevation of a reciprocatory frame comprised in said stroke-adjusting means and a latch for disconnecting the driving means from the belt-shifting means. Fig. 13 is a view of the parts shown in Fig. 12, partly in plan and partly in section. Fig. 14 is a fragmental side elevation of the shiftable belt-pressing means. Figs. 15 to 18 are fragmental detail views of portions of the means for manually shifting the point of contact of the belt. Fig. 19 is a sectional view showing an arm comprised in the presser frame.

In the embodiment of my invention which I have selected for illustration, the machine comprises a base 20 and two standards 21 rising from the ends of said base, the upper ends of said standards supporting a crossbeam 22 upon which is mounted the operating mechanism. The means for supporting the work to be finished comprises a pair of tracks 23 carried by brackets 24 slidably mounted on vertical guide-ways 25 at the inner sides of the standards 21. A table 26 having rollers 27 running upon the tracks 23 is adapted to support the work.

28 is a rod fixed to the table 26 and serving as a handle for moving the table.

The means for vertically adjusting the work table 26 may be of any suitable form, being herein shown as comprising vertical rods 29 mounted in bearings in the standards 21, said rods being screw-threaded into lugs 30 upon the brackets 24. The upper ends of the rods 29 carry bevel pinions 31 adapted to mesh with pinions 32 on a shaft 33 mounted in suitable bearings in the crossbeam 22.

The abrading or polishing belt 34 is mounted upon pulleys 35 and 36 fixed upon shafts 37 and 38, the latter being rotatably mounted in suitable bearings carried at the ends of the cross beam 22.

39 and 40 are, respectively, a fast and loose pulley mounted upon the shaft 37 for driving the belt 34.

It has been found in practice that in making belts the ends thereof are not always squarely sewed together, the result of which is that one edge of the belt may be of greater length than the other edge thereof. Obviously under these conditions if the pulleys 35 and 36 are truly alined the belt 34 will not run properly upon said pulleys. I have therefore provided an adjustable bearing for the shaft 38 in order that the pulley 36 may be shifted into such angular position that the belt 34 will run properly thereon. In the present instance the bearing comprises a member 41 (Figs. 3 and 4) slidably mounted upon guide-ways on the crossbeam 22, and a portion 42 having the bearings proper 43 thereon, the last mentioned portion being pivoted near one end as at 44 to said member 41. The opposite end of said portion 42 has a lug 45 to which is rotatably secured one end of a screw 46 threaded in a lug 47 upon the member 41 the opposite end of said screw carrying a hand-wheel 48 for pivotally adjusting the portion 42 with relation to the member 41 and thus varying the position of the pulley 36.

49 is a bolt fixed in the member 41 and extending through a slot 50 in the bearing portion 42.

The entire bearing may be moved longitudinally upon its guide-ways to adjust the tension of the belt 34 by means of a screw shaft 51 threaded in the lower portion of the bearing. In the present embodiment the shafts 33 and 51 are adapted to be rotated by means of crank handles 52 having hubs 53 mounted on said shafts and provided with notches 54 adapted to engage pins 55 fixed to the shafts 33 and 51.

The means for pressing the belt against the work comprises a presser frame 56 consisting in this instance of two side bars 57 (see Fig. 5) secured to a plurality of yokes 58. At the lower side of the presser frame 56 is a presser plate 59 which may be in the form of a strip of sheet metal, said presser plate being carried by pins 60 having heads 61 secured to said plate, said pins extending upwardly through arms 62 on the lower ends of the yokes 58 and having nuts 63 threaded on their upper ends. Coiled springs 64 lying between said arms 62 and the nuts 63 tend to raise the presser plate 59 upwardly to lie adjacent the lower ends of the yokes 58. Washers 60$^a$ of yielding material such as rubber may be placed upon the pins 60 to form a cushion between the heads 61 and the arms 62, and if desired a sheet of felt or the like may be secured to the presser plate for the same purpose. The two yokes 58 at the ends of the presser frame 56 may be connected with the presser plate 59 through the medium of links 65 said links normally lying in a substantially horizontal position. Secured to each of the bars 57 intermediate the yokes 58 is a plurality of arms 58$^a$ (Figs. 1 and 19) having angular lower ends similar to the lower ends 62 of the yokes 58. In the present instance each alternate one of the arms 58$^a$ is connected with the presser plate 59 in the same manner as the yokes 58 are connected to said plate. The arms 58$^a$ which are not connected with the presser plate may be provided with blocks 58$^b$ of yielding material beneath their angular ends so as to cushion engagement with said presser plate.

The means for carrying different points of the presser plate 59 downwardly to cause the belt to contact at different places on the work, and for automatically shifting the point of contact of the belt along the work, will now be described. Rotatably mounted in the side bars 57 of the presser frame 56 are a plurality of shafts 66, and to each of these shafts is secured an arm 67 having a bearing opening 68 in its lower end in which is rotatably mounted a shaft 69 carrying a pair of rollers 70 at its ends adapted to bear against the presser plate 59. The arms 67 may be fixed to the shafts 66 by any suitable means such as set screws 67$^a$. Sleeves 71 surrounding the shafts 66 are adapted to properly space the arms 67 from the side bars 57. The rollers 70 may be held in proper position with relation to the lower end of the arms 67 by means of sleeves 72 upon the shafts 69. The bearing openings 68 preferably have flaring ends, as indicated in Fig. 5, in order to permit the shafts 69 to rock and allow the rollers 70 to adjust themselves to any inequalities or uneven surfaces in the work.

Fixed upon the inner end of each of the shafts 66 is a pinion 73, said pinions supporting and being in constant mesh with a rack bar 74 which is slidably guided by one arm of each of the yokes 58 and by a suitable number of brackets 75 secured to said yokes. The arms 67 extend at angles to each other and at gradually increasing angles with reference to a vertical plane, as shown in Fig. 1. It will therefore be seen that when the rack bar 74 is reciprocated the arms 67, through rotation of the pinions 73 and shafts 66, will be successively carried into vertical position, each arm when in such position pressing the presser plate 59 and therefore the belt 34 downwardly at that point into contact with the work. As the rack bar 74 is reciprocated, the pairs of rollers 70 are successively carried into engagement with the presser plate 59 so that the point of contact of the belt with the work is caused to travel back and forth upon the work longitudinally of the belt 34.

If it be desired to press the belt down evenly upon the entire length of the work instead of shifting the point of contact as above described, all of the roller arms 67 may be turned out of contact with the presser plate 59 by loosening the set screws 67ª, so that when the presser frame is lowered the lower ends of the yokes 58 and arms 58ª will carry substantially the entire lower run of the belt into uniform contact with the work.

The presser frame 56 is supported by a plurality of links 76 pivotally carried by the outer ends of horizontal arms 77, the rear ends of said arms being fixed to a rock shaft 78 mounted in bearing brackets 79 secured to the crossbeam 22. Certain of the links 76 are pivotally connected with the outer ends of additional arms 80, the rear ends of said arms 80 being pivotally mounted in certain of the bearing brackets 79. The arms 77 and 80 constitute a parallel motion device by means of which the presser frame 56 is maintained in a vertical position in the swinging movement of the supporting arms. An arm 81 fixed to the rock shaft 78 carries a counter weight 82 adapted to balance the weight of the presser frame 56 and its supporting members. Said presser frame is moved downwardly to carry the belt 34 against the work by means of a hand lever to be presently described. It will be understood that the lower portion of the belt 34 runs beneath the presser plate 59.

The hand lever 83 for lowering the presser frame 56 to its work is in the present instance in the form of a square rod having a handle 84 at its forward end, the rod being mounted in a gimbal bearing 85 of any suitable construction. (See Figs. 9 and 10). In the present instance said bearing comprises a member 86 mounted on the crossbeam 22 for pivotal movement in a horizontal plane, a member 87 pivoted in the member 86 for movement in a vertical plane, and a sleeve 88 extending through the member 87 and rotatable therein, the lever 83 being slidable longitudinally in the sleeve 88. The lever 83 may be secured against rotary movement within the sleeve 88 by providing a collar 89 (Fig. 5) at the end of the sleeve, said collar having a square opening in which the square lever is slidably mounted.

Rotatably mounted upon the sleeve 88 is a roller 90 adapted to travel upon a semicircular track 91, the ends of said track being fixed to the two presser-frame-supporting links 76 adjacent the center of the machine. Adjustable stops 92 upon the track 91 limit the pivotal movement of the lever 83 in a horizontal plane. It will be seen that by depressing the forward end of the lever 83 the presser frame 56 will be lowered to carry the belt against the work.

As is common in machines of this character the work table 26 may be traversed forwardly and back upon the tracks 23 to carry the work under the belt 34. In thus pushing the table forwardly and back it is convenient for the operator to follow the table. To permit the operator to do this, and at the same time to retain complete control of the machine, the operating lever 83 is made of sufficient length so that the handle 84 may be held in the operator's hand even when the table 26 is at the forward limit of its movement, the lever 83 being slid rearwardly in its support as the table is pushed rearwardly under the belt 34. A stop pin 93 carried at the rear end of the lever 83 prevents the lever from being drawn too far forwardly.

Power is transmitted from the driving shaft 37 for reciprocating the rack bar 74 through the medium of a longitudinally extending shaft 94 (Fig. 2) rotatably mounted in bearings 95, said shaft being rotated by intermeshing worm gears 96 upon the driving shaft 37 and the shaft 94. Upon the opposite end of the shaft 94 a friction roll 97 is nonrotatably and slidably mounted. A friction disk 98 fixed on the rear end of a transversely extending rotary shaft 99 (Figs. 7 and 8) is arranged to contact the movable friction roll 97. The disk 98 is preferably keyed upon the shaft 99 and is arranged to be adjusted to take up wear and cause pressure by any common or preferred means, as for example a pair of screws 100 threaded in said disk and bearing at their inner ends against a collar 101. The shiftable clutch member 97 is adapted to be moved by any suitable means such as a member 102 having a fork 103 engaging in an annular groove 104 in said clutch member.

Surrounding the shaft 99 forwardly of the friction disk 98 and mounted in bearings in the crossbeam 22 is a sleeve 105 having at its forward end an annular flange 106, said flange having an annular flange 107 at its periphery. Fixed upon the forward end of the shaft 99 is a crank disk 108 and rotatably carried by said disk is a gear wheel 109 meshing with an internal gear wheel 110 secured to the forward edge of the flange 107. A crank pin 111 is secured in any suitable way to the gear wheel 109 so that in certain positions of the parts the axis of said crank pin will coincide with the axis of the shaft 99. A frame 112 which is horizontally slidable upon a guide bar 113 fixed to the crossbeam 22 has a vertical slot 114 therein into which the crank pin 111 extends so that movement of said crank pin in a horizontal direction will slide the frame 112. The crank pin 111 may have a block 115 rotatably secured thereon and slidable within the slot 114.

The reciprocatory movement of the frame 112 is arranged to be transmitted to the rack bar 74 in the present instance by means of a latch 116 pivotally secured at one end to said rack bar, said latch having a notch 117 therein adapted to fit over a pin 118 fixed to the frame 112. It is desirable at times, as will be explained later, to disconnect the rack bar 74 from the reciprocatory driving frame 112. I have therefore provided a yoke 119 secured to the latch 116, said yoke being adapted to be raised by a wing member 120 fixed upon the sleeve 88 which supports the operating handle 83. The wing member 120 is carried into engagement with the yoke 119 to lift the latch 116 by giving the operating handle 83 a twisting or rotary movement.

Referring now to Figs. 2, 6, 7 and 11: Upon the rear end of the sleeve 105 is fixed a worm wheel 121, said wheel meshing with a worm 122 fixed upon a shaft 123 rotatably mounted in a suitable bearing 124 carried upon the crossbeam 22. To the upper end of the shaft 123 is secured a pinion 125 said pinion meshing with a segment 126 fixed to the end of an arm 127, said arm being fixed with relation to the member 86 of the gimbal bearing 85 which supports the operating handle 83. It will be seen that pivotal movement of the handle 83 in a horizontal plane will swing the arm 127 and thereby rotate the pinion 125, the worm 122, the worm wheel 121, the sleeve 105, and the internal gear 110.

When the shaft 99 is rotated, the gear wheel 109 travels with the disk 108 around the inner periphery of the stationary internal gear 110. The internal periphery of the gear 110 is double that of the periphery of the gear 109, so that in each rotation of the shaft 99 the gear wheel 109 makes two complete rotations. When the relative positions of the gears 109 and 110 are as indicated in Fig. 11, rotation of the shaft 99 and therefore the disk 108 and gear 109 will not move the crank pin 111 in a horizontal direction, but will merely carry said pin upwardly and downwardly in its slot 114. The frame 112 and rack bar 74 will therefore be at a standstill. By rotating the internal gear 110 a quarter of a revolution in the manner hereinbefore described, the gear 109 will be moved through half a revolution, or into position where the crank pin 111 lies at the opposite side of said gear 109 from that shown in Fig. 11. In this position of the parts, when the shaft 99 is rotated the crank pin 111 does not move vertically but travels through its maximum horizontal distance, and the rack 74 is given its full reciprocatory movement. It will be understood that the internal gear 110 may be adjusted to any position intermediate the two extremes mentioned so that the rack 74 may be given any desired length of stroke. The proportions of the connections are such that the extreme pivotal movement of the operating handle 83 in a horizontal plane will be effective in rotating the internal gear 110 through a quarter revolution, or sufficient to regulate the horizontal movement of the crank pin 111 from its maximum to nothing.

When the latch 116 is raised, by twisting the operating handle 83 as hereinbefore described, the roller arm 67 which was in a vertical position at the time of disconnecting the latch will hold the belt in contact with the work at that point. In order to permit of manually shifting such contact point during the time the automatic driving means is disconnected from the shifting means, I provide the following mechanism: A rack member 128, which may be pivoted at one end upon the pin 129 to which the latch 116 is pivoted, has a series of teeth 130 adapted to be brought into mesh with teeth 131 formed on a portion of the outer periphery of the internal gear 110. (See Figs. 15 to 18). The rack member 128 is arranged to be moved into mesh with the gear 110 when the latch 116 is raised out of engagement with its driving means and for this purpose the rack member may be connected with said latch, the connection comprising, in the present instance, an L-shaped arm 132 secured to the latch 116, a pin 133 secured to the rack member 128 and passing loosely through said arm, and a coiled spring 134 surrounding said pin and bearing against said arm and said rack member. Thus when the latch 116 is swung upwardly the rack member 128 will be raised and yieldingly held in engagement with the gear 110.

In operation, when the operator desires to carry the belt into engagement with the work he depresses the forward end of the handle 83 to lower the presser frame 56. If it is desired to press the belt evenly against the work at all points, all of the roller arms 67 are turned out of engagement with the presser plate 59, whereupon the angular lower ends of the yokes 58 and arms 58ª engage the presser plate to carry the belt uniformly into contact with the face of the work. When the shifting means are used, the point of contact of the belt 34 against the work is automatically shifted along the work longitudinally of the belt, through the entire length of the presser frame 56. Should it be desired to limit or shorten the traveling movement of the rack bar 74, and therefore the space of contact with the work, the operating handle 83 is swung in a horizontal plane to change the relative position of the gear wheels 109 and 110, so that the throw of the crank pin 111 will be reduced. In case it is desired to hold the point of contact of the belt upon any particular spot of the work the operating handle 83 is given a twisting or rotary movement to raise the latch 116 out of engagement with the reciprocatory driving frame 112, the result of which is that the rollers 70 which were in a vertical position at the time the rack bar was disengaged, will hold the belt in contact with the work at that point.

At the time the latch 116 is raised the rack member 128 is carried into engagement with the gear 110. If now it is desired to manually shift the point of the belt contact, the hand lever 83 is swung in a horizontal plane to rotate the gear 110 as above explained, the rotation of said gear 110 reciprocating the rack member 128 and thereby the rack 74, so that any one of the arms 67 may be moved into and held in a vertical position to accurately position the point of contact of the belt on the work. A quarter rotation of the gear 110 is sufficient to reciprocate the rack bar 74 through its entire length of stroke. When the operator has finished a particular point or points as much as he desires, the latch 116 may again be permitted to descend and in the reciprocation of the frame 112 is engaged by the pin 118.

The friction drive for the shaft 99 is advantageous in that the speed of said shaft may thereby be easily controlled. It will be noted that when the mechanism has been adjusted to shorten the stroke of the rack bar 74, as much time is consumed by said rack bar, with a given speed of the shaft 99, in making each short stroke as is taken to make a long stroke. By means of the friction clutch the speed of the shaft 99 may readily be varied according to the length of stroke of the rack bar 74.

In previous machines of this character, the abrading or polishing means, whether composed of a belt and presser or a sanding or rubbing shoe, has been associated with moving or shifting means so that different points on the work may be operated on, and in some cases this moving or shifting means has been driven by a crank or the like. A crank drive is objectionable because the reciprocated part is not moved at a uniform speed throughout each stroke; it travels rapidly at the middle of the stroke and slows down at the ends. The means herein disclosed for driving the shifting means gives to said means an even speed throughout its stroke. It will be readily understood that this driving means may be embodied in machines of different types, for example, a machine comprising a reciprocatory pressing shoe, the driving means being effective in carrying the shoe over the work at a uniform speed throughout the stroke.

From the above it will be seen that my invention makes it possible for the operator to maintain perfect control of the machine at any point at which he is standing, so that he may lower the presser plate to its work, shorten the space upon the work through which the point of contact of the belt is moved, or he may hold the point of contact for any desired length of time upon a certain spot of the work, all by means of a single hand lever.

While I have herein described my invention in considerable detail for the sake of clearness, I do not wish to be understood as limiting myself to the construction shown, except as recited in the appended claims inasmuch as various modifications within the scope of my invention may be made by those skilled in this art.

I claim as my invention:

1. In a machine of the character described, the combination with an abrading or polishing belt, of means for pressing said belt against the work and for causing the point of contact of the belt with the work to travel back and forth, said means comprising a plurality of devices mounted on separate horizontal axes extending transversely of the belt, and being rotatable independently on said axes into and out of belt-pressing position.

2. In a machine of the character described, the combination with an abrading or polishing belt, of a presser frame, arms pivotally mounted on independent pivots in said frame and extending at angles to each other, and means for successively swinging said arms into belt-pressing position.

3. In a machine of the character described, the combination with an abrading or polishing belt, of a presser frame, a plurality of shafts rotatably mounted in said presser frame, an arm fixed to each of said shafts, said arms extending at angles with each other, and means for rotating said shafts to successively swing said arms into belt-pressing position.

4. In a machine of the character described, the combination with an abrading or polishing belt, of a presser frame, a plurality of shafts rotatably mounted in said frame, an arm fixed on each of said shafts, a pinion fixed on each of said shafts, a rack bar meshing with all of said pinions, and means for reciprocating said rack bar to successively carry said arms into belt-pressing position.

5. In a machine of the character described, the combination with an abrading or polishing belt, of a presser frame, a plurality of arms pivotally mounted in said frame, said arms extending at angles to each other and extending at gradually increasing angles with reference to one plane, a pinion fixed with relation to each of said arms, a rack bar meshing with all of said pinions, and means for reciprocating said rack bar.

6. In a machine of the character described, the combination with an abrading or polishing belt, of a presser frame, a plurality of shafts rotatably mounted in said presser frame, an arm fixed to each of said shafts, a cross shaft mounted in the lower end of each arm; a pair of rollers mounted on each of said cross shafts, a pinion fixed on each of the first mentioned shafts, a rack bar meshing with all of said pinions, and means for reciprocating said rack bar.

7. In a machine of the character described, the combination with an abrading or polishing belt, of a presser frame comprising two side bars, a presser plate carried by said frame, a plurality of shafts rotatably mounted in said side bars, an arm fixed to each of said shafts, said arms extending at angles to each other and extending at gradually increasing angles with reference to a vertical plane, a pair of rollers carried at the lower end of each of said arms, said rollers being adapted to yield or rock and to engage said presser plate, a pinion fixed on each of said shafts, a rack bar meshing with all of said pinions, and means for reciprocating said rack bar.

8. In a machine of the character described, the combination with an abrading or polishing belt, of a presser frame comprising a plurality of yokes, side bars fixed to the arms of said yokes, said arms having angular lower ends, a presser plate, pins fixed to said presser plate and extending through said angular ends, coiled springs surrounding said pins and tending to draw said presser plate upwardly, and means mounted in the presser frame for pressing said presser plate against the belt.

9. In a machine of the character described, the combination with an abrading or polishing belt, of a presser frame, means for shifting the point of contact of the belt along the work, said means including a plurality of independently pivoted belt-pressing devices mounted in said presser frame, power-driven means for actuating said shifting means, and means operable while the machine is in action for controlling said power-driven means to regulate the space of movement of said shifting means.

10. In a machine of the character described, the combination with an abrading or polishing belt, of means for pressing said belt against the work, means comprised in said pressing means for shifting the point of contact of the belt along the work, said pressing means being operable to press the belt to the work independently of said shifting means, power driven reciprocatory means for actuating said shifting means, and means for changing the stroke of said reciprocatory means.

11. In a machine of the character described, the combination with an abrading or polishing belt, of means for pressing said belt against the work, means comprised in said pressing means for automatically shifting the point of contact of the belt along the work, means for changing the operative space of said shifting means, means for driving said shifting means, and means for disconnecting said shifting means from said driving means while in motion.

12. In a machine of the character described, the combination with a framework having mounted thereon an abrading or polishing belt, of a presser frame movable up and down in said framework, means mounted in said pressed frame for shifting the point of contact of the belt along the work, power-driven means mounted on said framework for automatically actuating said shifting means, a hand lever for lowering said presser frame, and means operable by said hand lever for disconnecting said shifting means from said power-driven means.

13. In a machine of the character described, the combination with an abrading or polishing belt, of a presser frame, means for shifting the point of contact of the belt along the work, a hand lever for lowering said presser frame, means for driving said shifting means, and means operable by said hand lever for disengaging said driving means from said shifting means.

14. In a machine of the character described, the combination with an abrading or polishing belt, of a presser frame, means mounted in said frame for shifting the point of contact of the belt along the work, a hand lever for lowering said presser frame against said belt, means for driving said shifting means, and means operable by said hand lever for shortening the operative movement of said shifting means and for disconnecting said driving means from said shifting means.

15. In a machine of the character described, the combination of shifting means, means for driving said shifting means, a controlling lever mounted for twisting movement about its longitudinal axis, and means operable by such twisting movement of said lever for disengaging said driving means from said shifting means.

16. In a machine of the character described, the combination with a framework, of a presser frame movable up and down on said framework, shifting means mounted in said presser frame, a hand lever mounted on the framework for vertical and horizontal oscillation, the vertical oscillation of said lever being arranged to raise and lower said presser frame, and means operable by the horizontal oscillation of said lever for actuating said shifting means.

17. In a machine of the character described, the combination with an abrading or polishing belt, of means for pressing said belt against the work, means for shifting the point of contact of said belt along the work, means for driving said shifting means, and a single means for operating said pressing means and for disconnecting said driving means from said shifting means.

18. In a machine of the character described, the combination with an abrading or polishing belt, of means for pressing said belt against the work, means for shifting the point of contact of said belt along the work, means for changing the stroke of said shifting means, and a single instrumentality for controlling said pressing means, said shifting means and said stroke-changing means.

19. In a machine of the character described, the combination with an abrading or polishing belt, of means for pressing said belt against the work, means comprised in said pressing means for shifting the point of contact of the belt along the work, reciprocatory means for driving said shifting means, means for changing the stroke of said reciprocatory means, means for disconnecting said reciprocatory means from said shifting means, and a single hand lever arranged to control said pressing means, said stroke-changing means and said disconnecting means.

20. In a machine of the character described, the combination with an abrading or polishing belt, of means for pressing said belt against the work, means comprised in said belt-pressing means for shifting the point of contact of the belt along the work, an operating handle, a gimbal bearing in which said handle is rotatably mounted, reciprocatory means for driving said shifting means, means operable by a twisting movement of said handle for disconnecting said driving means from said shifting means, means operable by a pivotal movement of said handle in a horizontal plane for changing the stroke of said reciprocatory means, said belt-pressing means being controlled by pivotal movement of said handle in a vertical plane.

21. In a machine of the character described, the combination with an abrading or polishing belt, of a work table supported beneath said belt for traveling movement back and forth, a presser frame adapted to be moved downwardly to carry said belt against the work, means mounted in said presser frame for shifting the point of contact of said belt along the work, reciprocatory means for driving said shifting means, an operating handle, a gimbal bearing for said handle comprising a member mounted for pivotal movement in a horizontal plane, a second member mounted in the first member for pivotal movement in a vertical plane, a sleeve extending through said second member and rotatable therein, said operating handle extending through said sleeve and slidable longitudinally therein, said handle being of sufficient length to permit the operator to maintain his hold thereof in following the movements of said work table, an arcuate track fixed with relation to said presser frame, a roller mounted on said sleeve running on said track in the pivotal movement of said handle in a horizontal plane, means operable by such horizontal pivotal movement of said handle for changing the stroke of said reciprocatory driving means, and means operable by a twisting movement of said handle for disconnecting said driving means from said shifting means, said presser frame being arranged to be lowered by pivotal movement of said handle in a vertical plane.

22. In a machine of the character described, the combination with an abrading or polishing belt, of means for pressing said belt against the work, means comprising a reciprocatory rack bar for shifting the point of contact of said belt along the work, and means for reciprocating said rack bar comprising a slidable frame having a slot therein, a rotary shaft driving a crank pin lying in said slot, means for rotating said shaft, and a latch detachably connecting said slidable frame and said rack bar.

23. In a machine of the character described, the combination with an abrading or polishing belt, of means for pressing said belt against the work, means for shifting the point of contact of said belt along the work, means for driving said shifting means comprising a reciprocatory frame, a rotary shaft, a disk fixed on said shaft, a gear wheel rotatably mounted on said disk, a crank pin fixed to said gear wheel and adapted to engage said reciprocatory frame, a sleeve surrounding said shaft, an internal gear fixed to said sleeve and meshing with the first mentioned gear, and means for rotatably adjusting said sleeve.

24. In a machine of the character described, the combination with an abrading or polishing belt, of means for pressing the belt against the work, means comprised in said pressing means for shifting the point of contact of the belt along the work, means for driving said shifting means comprising a reciprocatory frame, a rotary shaft, a crank disk fixed on said shaft, a gear wheel rotatably mounted on said disk, a crank pin fixed to said gear wheel and engaging said frame, a sleeve surrounding said shaft, an internal spur gear wheel fixed with relation to said sleeve and meshing with the first mentioned gear wheel, and means for rotatably adjusting said sleeve comprising a worm wheel fixed thereon, a worm meshing with said wheel, and a hand lever and connections for rotating said worm.

25. In a machine of the character described, the combination with an abrading or polishing belt, of means for pressing said belt against the work, means comprising a reciprocatory rack bar for shifting the point of contact of the belt along the work, means for reciprocating said rack bar, a latch pivotally mounted on said rack bar and detachably engaging said reciprocatory means, and an operating handle and connections for releasing said latch from said reciprocating means.

26. In a machine of the character described, the combination of a drive shaft, a pulley fixed thereon, a second pulley, an abrading or polishing belt running on said pulleys, means for pressing said belt against the work, means for shifting the point of contact of the belt along the work, a rotary shaft, intermeshing worm gears on said shaft and said drive shaft, a second rotary shaft, friction clutch members upon said two rotary shafts, and means driven by the second mentioned rotary shaft for operating said shifting means.

27. In a machine of the character described in combination, a supporting framework, a drive shaft at one end of said framework and extending transversely thereof, a pulley fixed on said drive shaft, a second pulley, an abrading or polishing belt running on said pulleys, means for pressing said belt against the work, means for shifting the point of contact of said belt along the work, a second shaft extending longitudinally of said frame, intermeshing worm gears on said drive shaft and said second shaft, a third shaft extending transversely of said frame near the center thereof, interengaging clutch members mounted on said second shaft and said third shaft, and means driven by said third shaft for operating said shifting means.

28. In a machine of the character described, the combination of a main framework, a presser frame mounted therein for movement up and down, a gimbal bearing mounted on said main framework, a hand lever mounted in said bearing for vertical and horizontal oscillation and for twisting movement about its longitudinal axis, shifting means mounted in said presser frame, power-driven means mounted on the main framework for actuating said shifting means, twisting movement of said lever controlling the connection between said power-driven means and said shifting means, vertical oscillation of said lever being arranged to move said presser frame up and down, and means actuated by horizontal oscillation of said lever for manually operating said shifting means.

29. In a machine of the character described, the combination with an abrading or polishing belt, of means for pressing said belt against the work, and means for shifting the point of contact of the belt along the work, said shifting means traveling at a uniform speed throughout its movements.

30. In a machine of the character described, the combination with an abrading or polishing belt, of means for pressing said belt against the work, means for shifting the point of contact of the belt along the work, and reciprocatory means for driving said shifting means, said reciprocatory means moving at a uniform speed throughout the length of each stroke.

31. In a machine of the character described, the combination with an abrading or polishing belt, of means for pressing said belt against the work, means comprising a reciprocatory member for shifting the point of contact of the belt along the work, a rotary shaft, and an operative connection between said shaft and said member adapted to reciprocate said member at a uniform speed throughout its stroke.

32. In a machine of the character described, the combination of an abrading or polishing element, means for supporting the work, and reciprocatory means for moving said element into contact with different points upon the work, said reciprocatory means moving at a substantially uniform speed throughout the length of each stroke.

33. In a machine of the character described, the combination of an abrading or polishing element, and means adapted to move said element so that its point of contact with the work moves in a reciprocatory path, said means causing such contact point to be moved at a uniform speed throughout the length of each stroke.

34. In a machine of the character described, the combination of an abrading or polishing means including a reciprocatory part; and means for reciprocating said part including a rotary shaft, a crank on said shaft, a gear rotatably carried by said crank and having means engaging said reciprocatory part, and a relatively stationary internal gear meshing with the first mentioned gear.

35. In a machine of the character described, the combination of abrading or polishing means including a reciprocatory part; and means for reciprocating said part including a rotary shaft, a crank on said shaft, a gear rotatably carried by said crank and having means engaging said reciprocatory part, a sleeve surrounding said shaft, and an internal gear fixed to said sleeve and meshing with the first mentioned gear.

36. In a machine of the character described, the combination of a presser frame, and shifting means including a plurality of belt-pressing devices mounted in said presser frame, and an operating member also mounted in said frame and reciprocating longitudinally thereof, said operating member being associated with each of said belt-pressing devices and being arranged when reciprocated to successively move said devices into belt-pressing position.

37. In a machine of the character described, the combination with an abrading or polishing belt, of a presser frame comprising two side bars, a presser plate carried by said frame, means mounted in said frame adapted to engage said presser plate and move it to carry said belt into contact with the work, a plurality of yokes attached to said side bars, and a plurality of arms positioned intermediate said yokes, the lower ends of said arms and said yokes being adapted to engage said presser plate to carry the latter uniformly into engagement with said belt.

38. In a machine of the character described, the combination of an abrading or polishing belt, a series of belt-pressing devices, and means for successively moving said devices into belt-pressing position, including a longitudinally reciprocable device extending lengthwise of said series of belt-pressing devices and operatively associated with each of said belt-pressing devices whereby reciprocation of said longitudinal device will successively move the belt-pressing devices into belt-pressing position.

39. In a machine of the character described, the combination of abrading or polishing means, means for shifting the point of contact of said means along the work, means for driving said shifting means, and independent means for manually operating said shifting means.

40. In a machine of the character described, the combination of abrading or polishing means, power driven means for automatically shifting the point of contact of said means along the work, and means for manually operating said shifting means whereby the point of contact may be positioned and held at the will of the operator.

41. In a machine of the class described, the combination with an abrading or polishing belt, of means for pressing said belt against the work, means for shifting the point of contact of said belt along the work, means for driving said shifting means and means for manually operating said shifting means, said manual means being brought into operative condition when said driving means is disconnected from said shifting means.

42. In a machine of the character described, the combination of abrading or polishing means, means for shifting the point of contact of said means along the work, means for driving said shifting means, means for manually operating said shifting means, and means for connecting said shifting means to said driving means and said manually operating means alternately.

43. In a machine of the character described, the combination with an abrading or polishing belt, of means for pressing said belt against the work, means for shifting the point of contact of said belt along the work, a rotary shaft, a crank disk on said shaft, a gear wheel rotatably carried by said disk, a slidable frame, a crank pin on said gear wheel engaging said frame, a latch pivoted to said shifting means and releasably engaging said frame, a sleeve surrounding said rotary shaft, an internal gear wheel fixed to said sleeve and meshing with the first mentioned gear wheel, said internal gear wheel having a series of teeth on its outer periphery, means for rotating said sleeve, and a rack member pivotally attached to said shifting means, and adapted to mesh with the outer teeth on said internal gear, said member and said latch being connected together.

44. In a machine of the character described, the combination of an abrading or polishing belt, a plurality of rotary devices mounted on independent axes and arranged to press the belt to its work, and means for successively rotating said devices into belt pressing position.

45. In a machine of the character described, the combination of an abrading or polishing belt, a presser frame, and a plurality of devices rotatably mounted in said presser frame on individual separate axes, said devices being arranged to be successively moved into position to press the belt against the work.

46. In a machine of the character described, the combination of an abrading or polishing belt, a flexible presser plate beneath which one stretch of said belt runs, and means for pressing said presser plate downwardly to press the belt to its work, said means comprising a plurality of devices disposed along the presser plate and rotatably mounted on independent axes extending transversely of said presser plate, said devices being arranged to be moved successively into position to press the presser plate downwardly.

47. In a machine of the character described, the combination of an abrading or polishing belt, a flexible presser plate beneath which one stretch of said belt runs, a plurality of independently mounted devices disposed longitudinally along the upper side of said presser plate, and an operating member extending longitudinally of the presser plate and operatively associated with each of said devices whereby rectilinear reciprocation of said operating member will successively move said devices into belt-pressing position.

48. In a machine of the character described, the combination of an abrading or polishing belt, and a plurality of pressing devices above said belt, said devices being arranged to swing in a plane longitudinal of said belt and being movable successively into belt-pressing position.

49. In a machine of the character described, the combination of a framework, an abrading or polishing belt running over pulleys on said framework, a presser frame for moving one stretch of said belt into engagement with the work, means in said presser frame for shifting the point of contact of the belt along the work, a hand lever for raising and lowering said presser frame and for controlling the machine, and a bearing for said lever mounted on the framework and comprising a portion pivoted on the framework to swing in a horizontal plane, a second portion pivoted on the first portion to swing in a vertical plane, said hand lever being mounted in said second portion to slide forwardly and back.

50. In a machine of the character described, the combination of an abrading or polishing belt, a presser frame, means mounted in said presser frame for shifting the point of contact of the belt along the work, said shifting means including a longitudinally reciprocable operating member mounted lengthwise in the presser frame, a driving shaft mounted on the framework, and means including a disengageable link forming an operative connection between said driving shaft and said operating member.

51. In a machine of the character described, the combination of a framework, an abrading or polishing belt thereon, a presser frame mounted on the framework for movement up and down, means on the presser frame for automatically shifting the point of contact of the belt along the work, said shifting means comprising a plurality of devices pivoted in the presser frame and a longitudinal operating member connected to all of said devices, a drive shaft rotatably mounted on the framework, and an operative connection between said drive shaft and said longitudinal operating member.

52. In a machine of the character described, the combination of a framework, an abrading or polishing belt mounted thereon, a presser frame movable up and down in said framework, means for shifting the point of contact of the belt along the work, said means comprising a plurality of belt pressing devices, spaced along the presser frame and mounted therein in a fixed longitudinal relation to the frame, and a reciprocatory member mounted in and extending longitudinally of the presser frame and operatively associated with said devices for moving the devices successively into belt-pressing position, a drive shaft mounted on the framework, and an operative connection between said drive shaft and said reciprocatory member.

53. In a machine of the character described, the combination of a framework, a presser frame mounted on said framework for movement up and down, shifting means comprising a plurality of movable pressing devices and a longitudinal operating member therefor mounted in said presser frame, a drive shaft mounted on the framework, and an operative connection between said drive shaft and said operating member.

54. In a machine of the character described, the combination of a framework, a presser frame mounted thereon for movement up and down, shifting means including a plurality of movable belt-pressing devices and a reciprocatory operating member therefor mounted on said presser frame, a reciprocatory device mounted on the framework and arranged to be connected to said reciprocatory operating member, a rotary drive shaft on the framework, and means operatively connecting said drive shaft to said reciprocatory device, said means being adjustable to change the length of reciprocation of said reciprocatory device.

55. In a machine of the character described, the combination of a framework, a presser frame mounted thereon for movement up and down, shifting means mounted on the presser frame and including a reciprocatory operating member, a reciprocatory driving member mounted on the framework, and a disengageable connection between said driving member and said operating member.

56. In a machine of the character described, a presser frame including a flexible presser plate, a series of rotary pressing devices mounted in said presser frame on independent axes extending transversely of said presser plate, said devices being arranged to be rotated singly and successively into engagement with said presser plate, and a member extending longitudinally of the presser frame and operatively connected to all of said pressing devices.

57. In a machine of the character described, a presser frame including a flexible presser plate, and a plurality of rotary pressing devices spaced apart and mounted in the presser frame above said presser plate, said devices being independently mounted in the presser frame and being arranged to rotate in a plane extending longitudinally of said presser frame.

58. In a machine of the character described, the combination with an abrading or polishing belt, of means for pressing said belt against the work and for causing the point of contact of the belt with the work to travel back and forth, said means comprising a presser frame, a series of spaced pressing devices independently mounted in said frame, a longitudinally extending actuating member arranged to operate said pressing devices successively, and manually operable means for effecting rectilinear reciprocation of said actuating member.

59. In a machine of the character described, a presser frame, a plurality of pressing arms spaced apart and pivoted in said presser frame on independent axes extending transversely thereof, and a reciprocatory member extending longitudinally of the presser frame and operatively connected to all of said arms.

60. In a machine of the character described, a presser frame including a flexible presser plate, a series of arms spaced apart and pivoted in the presser frame above said plate on axes extending transversely of the frame, and means for moving said arms singly and successively into engagement with said presser plate.

61. In a machine of the character described, a presser frame, a series of arms mounted on independent axes in said presser frame, and means for singly and successively swinging said arms into pressing position.

62. In a machine of the character described, a presser frame, a series of arms spaced apart and pivoted in said presser frame on independent transverse axes, whereby the arms swing longitudinally of the presser frame, and means for swinging said arms successively into pressing position.

63. In a machine of the character described, a presser frame including a flexible presser plate, a series of arms spaced apart and pivoted on independent transverse axes in the presser frame, rollers carried by said arms and arranged to bear against said presser plate, said arms extending in gradually increasing angles with reference to a given plane, and a reciprocatory member extending longitudinally of the presser frame and operatively connected to all of said arms.

64. In a machine of the character described, a presser frame, a longitudinally reciprocable operating member mounted on and extending lengthwise of said presser frame, a flexible presser plate mounted on said frame, an abrading or polishing belt against which said plate bears, and means mounted in said presser frame and operable by said reciprocatory operating member for moving the belt into contact with the work and for causing such point of contact to shift along the work.

65. In a machine of the character described, a presser frame including a flexible presser plate, a plurality of independent transverse shafts mounted in said presser frame, a plurality of arms each fixed on one of said shafts and arranged to directly engage said presser plate, said arms extending at gradually increasing angles with reference to a given plane, and a reciprocatory operating member mounted on the presser frame longitudinally thereof and operatively connected to all of said shafts.

66. In a machine of the character described, a presser frame, shifting means mounted therein, a drive shaft, a disengageable connection between said drive shaft and said shifting means, a hand lever arranged to operate said disengageable connection, and means operable by said hand lever for actuating said shifting means.

67. In a machine of the character described, the combination of an abrading or polishing belt, means for shifting the point of contact of said belt along the work, power means for driving said shifting means, a hand lever and means operable by said hand lever for actuating said shifting means.

68. In a machine of the character described, a presser frame, shifting means mounted therein, a drive shaft, a disengageable connection between said drive shaft and said shifting means, and a hand lever for lowering said presser frame, said hand lever being arranged to operate said disengageable connection.

69. In a machine of the character described, the combination of an abrading or polishing belt, a presser frame arranged to carry a relatively large portion of said belt into uniform contact with the work, and means mounted in the presser frame for causing only a small portion of the belt to contact the work and for shifting such point of contact along the work, said means being withdrawable from operative position to permit the presser frame to press the belt independent of said means.

70. In a machine of the character described, the combination of shifting means, comprising a plurality of belt-pressing devices movable successively into pressing position and an operating member connected to all of said devices, means for automatically driving said operating member, and means for manually actuating said operating member.

71. In a machine of the character described, the combination of shifting means, means for automatically actuating said shifting means through a complete reciprocation, means operable while the machine is in action for controlling the length of such reciprocation, and means for manually operating said shifting means.

72. In a machine of the character described, the combination of a framework having a pair of pulleys thereon, an endless abrading or polishing belt running over said pulleys, a work table beneath said belt, means for moving the belt toward the work, mechanism for automatically and continuously shifting the point of contact of the belt along the work, and a single hand lever for controlling said means and said mechanism.

73. In a machine of the character described, the combination of a framework having a pair of pulleys thereon, an endless abrading or polishing belt mounted on said pulleys, a presser frame mounted for movement up and down in the framework between the reaches of said belt, said frame being arranged to engage the lower reach of said belt, shifting means mounted in said presser frame, and comprising a plurality of devices movable successively into belt-pressing position and an operating member associated with all of said devices, a continuously rotated drive shaft, and means connecting said drive shaft with said operating member.

74. In a machine of the character described, the combination of a framework, an abrading or polishing belt mounted thereon, a presser frame mounted in the framework for vertical movement, shifting means comprising a plurality of belt-pressing devices rotatably mounted in the presser frame for movement successively into belt pressing position and an operating member associated with all of said devices, a drive shaft on said framework, and a connection between said drive shaft and said operating member permitting the vertical movement of said presser frame.

75. In a machine of the character described, the combination of a framework, an abrading or polishing belt mounted thereon, a presser frame mounted on the framework for movement up and down, shifting means mounted in said presser frame, driving means mounted on the framework, and a connecting member pivoted on a portion of said shifting means and arranged to engage a portion of said driving means.

76. In a machine of the character described, the combination of shifting means, means for driving said shifting means, a controlling lever, means operable by twisting movement of said lever for disengaging said driving means from said shifting means, and means operable by a horizontally oscillating movement of said lever for manually controlling and actuating said shifting means.

77. In a machine of the character described, a presser frame, shifting means mounted therein, driving means, a disengageable connection between said shifting means and said driving means, a hand lever for lowering said presser frame, and means movable by twisting said hand lever to release said disengageable connection.

78. In a machine of the character described, a presser frame, shifting means mounted therein and including an operating member reciprocating longitudinally of the presser frame, and means for manually reciprocating said member including a hand lever mounted to swing in a horizontal plane, a gear segment movable with said lever, a rotary shaft operatively connected to said reciprocatory member, and a gear connection between said segment and said shaft.

79. In a machine of the character described, a vertically movable presser frame, shifting means mounted therein and including an operating member reciprocating longitudinally of said presser frame, and means for manually actuating said member including a hand lever, a gear segment arranged to be oscillated thereby, a rotary shaft, a pinion fixed on said shaft and meshing with said segment, a worm fixed on said shaft, a second shaft, a worm wheel fixed on the second shaft and meshing with said worm, and a rack and pinion connection between said second shaft and said reciprocatory operating member.

80. In a machine of the character described, the combination of a framework, an abrading or polishing belt mounted thereon, a presser frame mounted on the framework for movement up and down, shifting means mounted in the presser frame and including a reciprocatory operating member, a hand lever pivoted on the framework, a rack bar pivoted to said reciprocatory operating member, and a gear meshing with said rack bar and arranged to be oscillated by said hand lever.

81. In a machine of the character described, the combination of an abrading or polishing belt, means for causing the point of contact of the belt with the work to reciprocate back and forth, and means to cause the speed of such reciprocation to be uniform from end to end of the stroke, the latter means including a stationary internal gear wheel, a rotary shaft, a radial flange on one end of said shaft, a pinion rotatably mounted on said flange and meshing with said internal gear wheel, a pin carried by said pinion and arranged to coincide at times with the axis of said shaft, and a reciprocatory member actuated by said pin.

82. In an abrading or polishing machine, shifting means including a reciprocatory part, and means for reciprocating said part including a rotary shaft, a radial flange on said shaft, a pinion rotatably mounted on said radial flange, a pin carried by said pinion and arranged to coincide at times with the axis of said shaft, said pin being arranged to actuate said reciprocatory part, a relatively stationary internal gear meshing with said pinion, and means for rotatably adjusting the position of said internal gear.

83. In a machine of the character described, a frame-work, an abrading or polishing belt mounted thereon, a vertically movable presser frame, shifting means including an operating member mounted in the presser frame for longitudinal reciprocation, driving means mounted on the framework and including a reciprocatory device, and a pivoted latch arranged to connect said device to said operating member.

84. In a machine of the character described, a framework, an abrading or polishing belt mounted thereon, a vertically movable presser frame, shifting means mounted in said presser frame and including a reciprocable operating member, driving means mounted on the framework and including a reciprocatory device, a pivoted latch arranged to connect said device to said operating member, a hand lever, a gear arranged to be oscillated by said hand lever, and a rack pivoted to said operating member, said hand lever being arranged to disengage said latch and move said rack into engagement with said gear.

85. In a machine of the character described, a framework, an abrading or polishing belt mounted thereon, a vertically movable presser frame, shifting means mounted in said presser frame and including a reciprocatory operating member, means on the framework for automatically actuating said operating member, a hand lever, means on the framework operable by said hand lever for actuating said operating member, and disengageable means operable by said hand lever for connecting said operating member respectively to said automatic actuating means and to said hand actuating means.

86. In a machine of the character described, shifting means, power driving means for said shifting means, separate means for manually driving said shifting means, and means for connecting said shifting means to said power and said manual driving means.

87. In a machine of the character described, a presser frame, shifting means comprising a plurality of pressing devices mounted in said presser frame, power driving means for said shifting means, means for manually operating said shifting means, and means for connecting said shifting means alternately to said power and said manual driving means.

88. In a machine of the character described, a presser frame, shifting means mounted therein, a drive shaft, a hand operating lever, and mechanism for alternately connecting said shifting means to said drive shaft and said hand operating lever.

89. In a machine of the character described, a presser frame, shifting means mounted therein and including a reciprocatory operating member, power means for reciprocating said member, a hand lever, and mechanism operable by said hand lever and acting at times to change the length of stroke of said operating member, and acting at other times as manual driving means for said member.

90. In a machine of the character described, a presser frame including a flexible presser plate, and a plurality of devices mounted in said presser frame and arranged to successively move said presser plate downwardly, all of said devices being withdrawable from their pressing position, whereby said presser plate will be moved by the presser frame independent of said devices to carry the belt into uniform engagement with the relatively large surface of the work.

91. In a machine of the character described, the combination of an abrading or polishing belt, a plurality of independently mounted belt-pressing devices, and automatic means for continuously moving said devices singly and successively into belt-pressing position.

92. In a machine of the character described, the combination of an abrading or polishing belt, a series of belt-pressing devices, and means for successively moving said devices into belt-pressing position including a rectilinearly reciprocatory device extending longitudinally of said series of belt-pressing devices and operatively associated with each of said belt-pressing devices.

93. In a machine of the character described, a presser frame, a series of arms spaced apart and pivoted in said presser frame on independent transverse axes, an actuating member extending longitudinally of said series of arms and operatively associated with each arm, and means for driving said actuating member to swing said arms into pressing position.

94. In a machine of the character described, a presser frame, a series of spaced pressing devices independently mounted in said frame, an actuating member extending longitudinally of said series and operatively associated with each of said pressing devices, and power means for continuously driving said actuating member.

95. In a machine of the character described, the combination of shifting means, power means for driving said shifting means, a controlling lever, means operable by said lever for disengaging said driving means from said shifting means, and means operable by said lever for manually controlling and actuating said shifting means.

96. In a machine of the character described, a presser frame, a thin flexible presser plate extending from end to end of the presser frame at the lower side thereof, pins secured along the side edges of said plate for connecting said plate to said frame, and coiled springs acting on said pins and tending to draw said plate upwardly.

97. In a machine of the character described, a frame, a presser plate at the lower side of said frame, yieldable means located along the side edges of said plate and tending to draw the presser plate upwardly, and means between said yieldable means for pressing the plate downwardly.

98. In a machine of the character described, a frame, a presser plate at the lower side of said frame, means located along the side edges of said plate for connecting said plate to said frame, said means including springs tending to hold the plate in its uppermost position, and means mounted in said frame above the mid-portion of said plate for pressing said plate downwardly.

99. In a machine of the character described, a frame, a presser plate at the lower side of said frame, means connecting said plate to said frame and including springs tending to draw the plate upwardly and hold said plate in a horizontal plane adjacent to the bottom of said frame, and means mounted in the frame and independent of said connecting means for pushing portions of the plate downwardly.

100. In a machine of the character described, a frame, a flexible presser plate beneath said frame, pins fixed to said presser plate near its side edges and extending upwardly through portions of said frame, and coiled springs surrounding said pins and tending to hold said plate in its uppermost position.

101. In a machine of the character described, a part mounted for reciprocation, a rotary member carrying a crank pin which is operatively associated with said part, and means for actuating said rotary member and for controlling the effective distance through which said crank pin moves.

102. In a machine of the character described, the combination of a reciprocatory part, a rotary member having a crank pin operatively associated with said part for driving the latter, and mechanism for constantly driving said rotary member and for changing the distance of movement of said crank pin in the direction of reciprocation of the first mentioned part.

103. In a machine of the character described, the combination of a part mounted for horizontal reciprocation, a rotary member having a crank pin operatively associated with said part for reciprocating the latter, and means for driving said rotary member and for changing the ratio of the horizontal travel of said crank pin to its vertical travel.

104. In a machine of the character described, the combination of a reciprocatory part, and means for reciprocating said part including a rotary shaft, a crank on said shaft, a pinion rotatably mounted on said crank, a crank pin carried by said pinion and operatively associated with said part, and a relatively stationary internal gear meshing with said pinion.

105. In a machine of the character described, the combination of a reciprocatory part, and means for reciprocating said part including a rotary shaft, a crank fixed on said shaft, a pinion rotatably mounted on said crank, a crank pin carried by said pinion, a relatively stationary internal gear wheel meshing with said pinion, and means for rotatably adjusting said gear wheel.

106. In a machine of the character described, the combination of a part mounted for reciprocation and having a slot extending transversely of the direction of reciprocation, and means for reciprocating said part including a rotary shaft, a crank fixed on said shaft, a pinion rotatably mounted on said crank, a crank pin carried by said pinion and extending into said slot, said crank pin being arranged to be moved into position with its axis substantially coinciding with the axis of said shaft, and a relatively stationary internal gear wheel meshing with said pinion.

107. In a machine of the character described, the combination of a reciprocatory part, and means for reciprocating said part including a rotary shaft, a crank disk fixed on said shaft, a pinion rotatably mounted on said disk, a crank pin carried by said pinion and operatively associated with said part, a sleeve rotatably fitting on said shaft, an internal gear wheel fixed with relation to said sleeve and meshing with said pinion, and means for rotatably adjusting said sleeve.

108. In a machine of the character described, the combination of a framework, a guide thereon, a reciprocatory part mounted on said guide, means for reciprocating said part, shifting means including a reciprocatory member, and a disengageable connection between the said member and the said part.

109. In a machine of the character described, shifting means including a reciprotory part, a shaft, a gear fixed on said shaft, a rack pivoted to said part and arranged to be moved into mesh with said gear, an oscillatory hand lever, and a gear connection between said hand lever and said shaft.

110. In a machine of the character described, shifting means including a reciprocatory part, a rack bar pivoted to said part, a shaft, a gear fixed on said shaft and arranged to mesh with said rack bar, a hand lever, and means operable by the hand lever for rocking said shaft and for moving said rack bar into and out of mesh with said gear.

111. In a machine of the character described, shifting means including a reciprocatory part, and driving means including a rotary member carrying a crank pin, and means for adjusting the throw of said crank pin while the driving means is in motion, whereby to control the length of stroke of said shifting means.

112. In a machine of the character described, the combination of a part mounted for reciprocation, a crank pin operatively associated with said part, a drive shaft connected with said crank pin for revolving said pin, and means for changing the length of stroke of said pin in one direction while the pin is in motion.

113. In a machine of the character described, the combination with an abrading or polishing belt, of a presser frame, a series of arms spaced apart and pivoted in said presser frame on independent transverse axes to swing longitudinally of said belt, a longitudinally reciprocable actuating member extending lengthwise of said series of arms and operatively associated with each arm, and means for reciprocating said actuating member to swing said arms successively into belt-pressing position.

114. In a machine of the character described, the combination of a main framework, a presser frame mounted therein for movement up and down, shifting means mounted in said presser frame, power-driven means on the main framework for actuating said shifting means, a hand lever for moving said presser frame up and down, and means operable by said hand lever for controlling the length of reciprocation of said shifting means.

115. In a machine of the character described, the combination with a main framework, of a presser frame mounted therein for movement up and down, shifting means mounted in said presser frame, power-driven means on the main framework for actuating said shifting means, a hand lever for raising and lowering said presser frame, and means operable by said hand lever for varying the length of reciprocation of said shifting means and for disconnecting said shifting means from said power-driven actuating means.

116. In a machine of the character described, the combination of shifting means, power driven means for actuating said shifting means, a manually operable lever, and means actuated thereby for varying the length of reciprocation of said shifting means and for disconnecting said power driven means from said shifting means.

117. In a machine of the character described, the combination of a main framework, a presser frame mounted therein for movement up and down, shifting means mounted in said presser frame, power-driven means on the main frame work for automatically actuating said shifting means, a hand lever for raising and lowering said presser frame, and means operable by said hand lever for controlling the connection between said shifting means and said power-driven actuating means.

118. In a machine of the character described, the combination of shifting means, power means for automatically actuating said shifting means, a hand lever, means arranged to form a driving connection between said hand lever and said shifting means for manually actuating the latter, and disengageable means operable by said hand lever for connecting said shifting means respectively to the automatic actuating means and to the hand actuating means.

119. In a machine of the character described, the combination of an abrading or polishing belt, a plurality of belt-pressing devices arranged to be successively moved into pressing position, and power driven means for continuously actuating said devices to automatically shift the point of contact of the belt along the work.

In testimony whereof I affix my signature in presence of two witnesses.

DE LASKI T. CLEMONS.

Witnesses:
C. PAUL PARKER,
GEORGE L. CHINDAHL.